(12) United States Patent  
Beyda

(10) Patent No.: US 7,133,695 B2  
(45) Date of Patent: Nov. 7, 2006

(54) SYSTEM AND METHOD FOR AUTOMATIC MOBILE DEVICE ACTIVATION

(75) Inventor: William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 836 days.

(21) Appl. No.: 09/965,371

(22) Filed: Sep. 26, 2001

(65) Prior Publication Data

US 2003/0060234 A1    Mar. 27, 2003

(51) Int. Cl.  
*H04B 1/38* (2006.01)

(52) U.S. Cl. .................... 455/560; 455/435.1; 455/420

(58) Field of Classification Search ................ 455/406, 455/408, 410, 411, 412.1, 414.1, 415, 418–420, 455/435.1, 551, 560; 370/328  
See application file for complete search history.

(56) References Cited

U.S. PATENT DOCUMENTS 5,887,253 A * 3/1999 O'Neil et al. ................ 455/418
5,956,636 A * 9/1999 Lipsit .......................... 455/411
6,628,934 B1 * 9/2003 Rosenberg et al. .......... 455/411
6,636,489 B1 * 10/2003 Fingerhut .................... 370/328
6,879,825 B1 * 4/2005 Daly ........................... 455/419

* cited by examiner

*Primary Examiner*—Melur Ramakrishnaiah

(57) ABSTRACT

A telecommunications network includes a central service center (112) for maintaining a master system database (122, 124) and propagating to switch databases preactivation information. Local switches (114) include or are operably coupled to switch databases (126, 128) and PIN collection units (130). The central service center (112) is adapted to receive a PIN and preactivation information, and then propagate this information to the local switch databases (128). The local switches (114), associated databases and PIN collection units, are adapted to detect a power on of a cellular telephone, receive and check and PIN, and activate to allow service to the telephone. The local switches (114) are further adapted to transmit the activation information to either the central master database (122, 124) (which will then transmit to other switches) or to propagate the activation information to other switch databases itself.

24 Claims, 3 Drawing Sheets

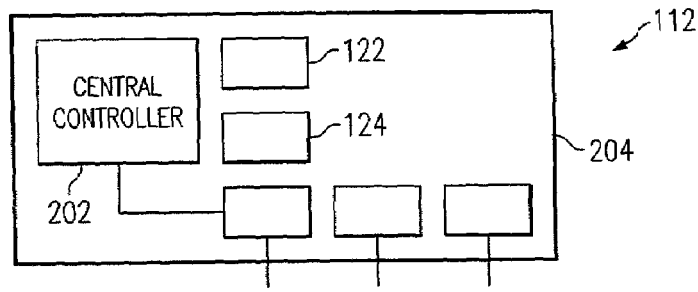
FIG. 2
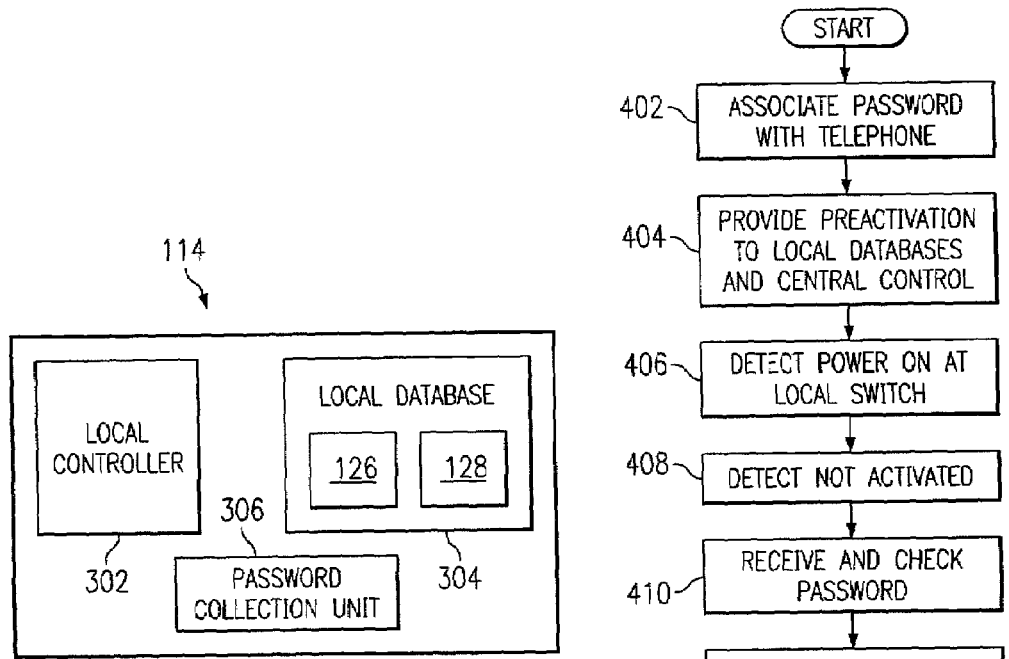
FIG. 3
FIG. 4

SYSTEM AND METHOD FOR AUTOMATIC MOBILE DEVICE ACTIVATION

BACKGROUND OF THE INVENTION

1. Field of the Invention

The present invention relates to telecommunications devices and, in particular, to an improved system and method for mobile device activation.

2. Description of the Related Art

Cellular telephones are typically shipped from factory or other remote location deactivated. This ensures that the telephones cannot be intercepted en route and used, with the owner's account being charged for the usage. To activate the telephone, the user must typically call a customer service number or press a key on the telephone which connects the telephone to customer service. The customer service center is typically located at a centralized location. The user then provides information such as the telephone serial number and a billing address, and receives a telephone number assigned to the phone. The telephone network then updates its databases with the new information.

However, before the user can use the telephone, he must wait for the database changes to propagate from the customer service center through all the switches in the network, or at least until switch or switches local to the user are updated. As can be appreciated, this can take a considerable period (on the order of several hours), particularly since the updates usually are batched and only periodically sent out throughout the network.

As such, there is a need for an improved system for activating a cellular telephone. There is a further need for an improved method for propagating cellular telephone activation update changes through a cellular telephone network.

SUMMARY OF THE INVENTION

These and other drawbacks in the prior art are overcome in large part by a system and method according to the present invention.

A method according to an embodiment of the present invention includes providing a user with a personal identification number upon purchase of the cell phone. The cell phone then ships, while the cellular network activates the telephone in a preactivation mode. In the preactivation mode, the cellular telephone's telephone number, the PIN, and other activation information, such as the telephone serial number, propagate out from a central switching center, such as the customer service center. When the customer receives the telephone, he turns it on. This is detected by the local switch, which accesses its (or an associated) database to determine that the telephone is in preactivation mode. Next, the switch sends this information to a PIN Collection Unit, such as an interactive voice response (IVR) unit, where the PIN is collected. If the PIN is entered correctly, the PIN Collection unit informs the switch's database which puts the telephone into a fully active mode. The telephone is then ready for use within the switch's service area, i.e., the user can make telephone calls. The switch then sends the fully activated update message to other switch databases in the network. Later, if the user travels outside his switch area of service, the telephone will be functional.

A network switch according to an embodiment of the present invention includes a controller, a switch database for storing preactivation information for purchased telephones, and a personal identification number (PIN) collection unit coupled to the controller for receiving PINs from telephone purchasers. The switch database receives the preactivation information from the central service or control enter. The preactivation information includes a PIN that is stored in the PIN collection unit. If the purchaser switches on the telephone in the region serviced by the switch, the switch activates the PIN collection unit. The PIN collection unit receives the input PIN and, if entered correctly, informs the controller, which puts the telephone into a fully activated mode in the database. The controller further sends the activation information on to other switch databases and the central control center.

A method according to an embodiment of the present invention includes receiving a personal identification number (PIN) and other preactivation information at a central service center, propagating the preactivation information to switch databases within the network, and storing the PIN in a PIN collection unit. The method further includes detecting a telephone, receiving the PIN at the PIN collection unit from a telephone, and updating the switch database responsive to receiving the PIN. Finally, the method includes activating the telephone and propagating the activation data to other switch databases or the central service center.

A telecommunications network according to an embodiment of the present invention includes a central service center for maintaining a master system database and propagating to switch databases preactivation information. Local switches include or are operably coupled to switch databases and PIN collection units. The central service center is adapted to receive a PIN and preactivation information, and then propagate this information to the local switch databases. The local switches, associated databases and PIN collection units, are adapted to detect a power on of a cellular telephone, receive and check a PIN, and activate to allow service to the telephone. The local switches are further adapted to transmit the activation information to either the central master database (which will then transmit to other switches) or to propagate the activation information to other switch databases itself.

BRIEF DESCRIPTION OF THE DRAWINGS

A better understanding of the invention is obtained when the following detailed description is considered in conjunction with the following drawings in which:

FIG. 2 is a block diagram of a telecommunications central control center according to an embodiment of the present invention;

FIG. 3 is a block diagram of a telecommunications switch according to an embodiment of the present invention;

FIG. 4 is a flowchart illustrating operation of an embodiment of the present invention;

DETAILED DESCRIPTION OF THE INVENTION

Figure 1:
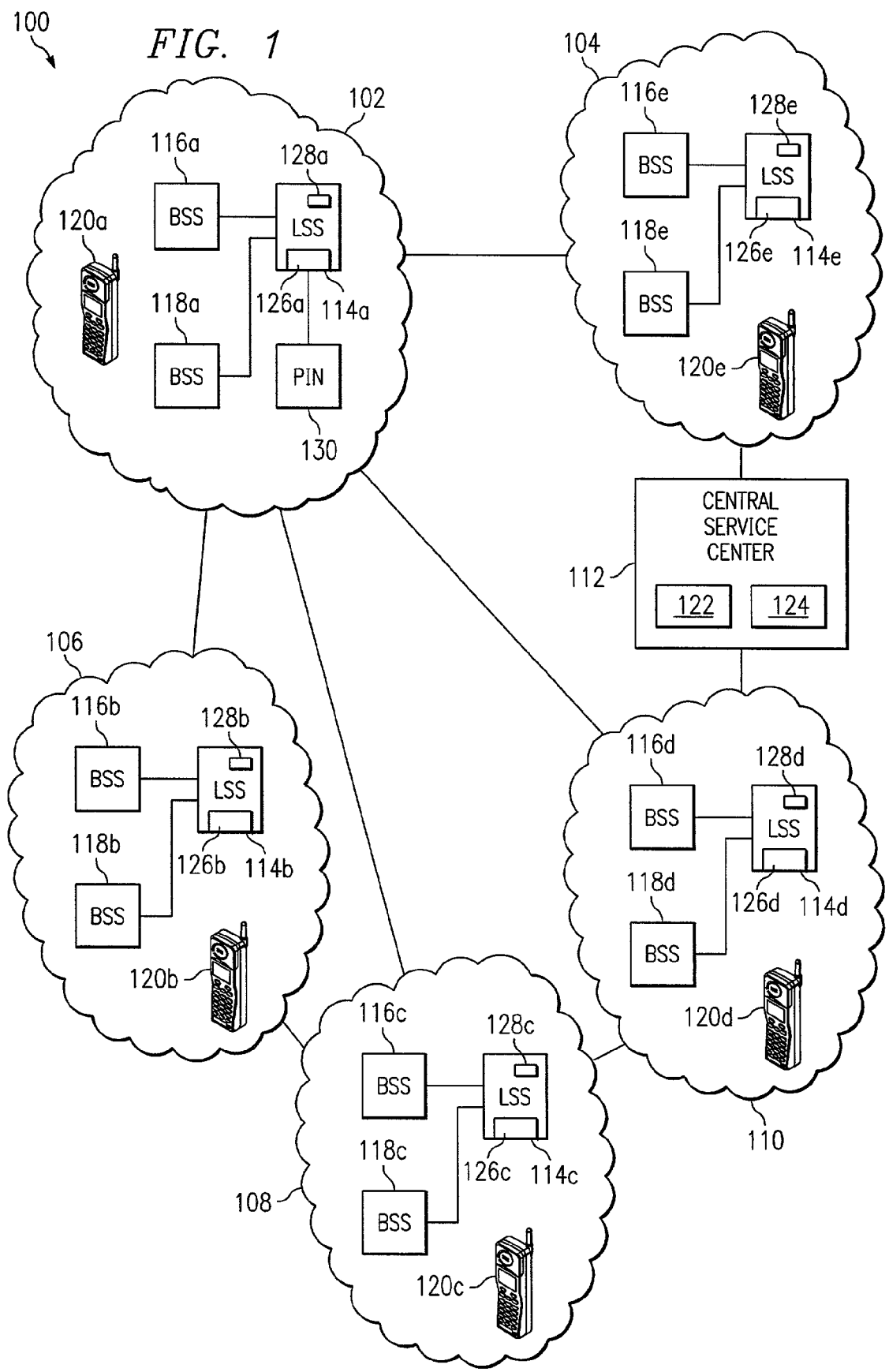
FIG. 1 is a block diagram of a telecommunications system according to an embodiment of the present invention.

Turning now to the drawings and, with particular attention to FIG. 1, a diagram of a telecommunications system 100 according to an embodiment of the present invention is shown. The telecommunications system 100 is representative of, for example, a nationwide cellular telephone network, such as a GSM, DECT, or other cellular network.

As shown, the network 100 includes a plurality of local networks 102, 104, 106, 108, 110, serviced by local switches 114a–114e. The local switches may include one or more control processors (not shown) and provide switching functions to a plurality of cells within the local networks, as is well known; basic local switches are available from a variety of manufacturers. The local networks 102a–102e typically further include a plurality of base stations 116a–116e, 118a–118e, also available from a variety of manufacturers. The base stations 116a–116e, 118a–118e provide antennas and associated equipment for receiving signals from cellular telephones 120 within cells. The base stations 116a–116e, 118a–118e further include equipment to transmit signals between the cellular phones 120 and the local switches 114a–114e. The local switches 114a–114e in turn couple to central offices (not shown) and, ultimately, to a central customer service center 112.

As will be explained in greater detail below, according to embodiments of the present invention, the central service center 112 maintains a master database of active users 122. The central service center 112 further maintains a database 124 of preactivation information and passwords for users whose cellular telephones have not been fully activated. Further, the central service center 112 maintains various equipment for receiving and transmitting updates to the various databases.

The local switches 114a–e similarly maintain a database of active users 126a–e, respectively, and a database of preactivation information 128a–e, respectively, propagated from the central service center 112, as will be explained in greater detail below. The local switches 114a–e may each further include password collection units 130 (only one of which is shown) which are used to receive and verify password information during final activation.

In operation, a password or personal identification number (PIN) is assigned to a new cellular telephone at a point of sale, such as Internet, etc. The password and associated preactivation information are sent to the central service center 112 and stored in the preactivation database 124. The central service center 112 then sends the preactivation information, including the password, to the local switches in the network. The preactivation information is stored in the local preactivation database 124. Then, when the user switches the cellular telephone on, the local switch detects the power on and also determines that the telephone is preactivated. The user can then submit the password to the password collection unit 130, which compares the received password with the one in its database. If verified, then the local switch activates the cellular telephone, i.e., is able to accept communication from the phone. The local switch then updates its preactivation database 128, and its activation database 126 to include the now-active telephone. Further, the local switch transmits the new activation information to the other local switches or the central service center. The other components in the system then update their databases so that the cellular telephone will function in their regions.

FIG. 2 is a block diagram of an exemplary central service center according to an embodiment of the present invention. Central service centers suitable for use in conjunction with the present invention are available from a variety of manufacturers. As shown, the central service center 112 includes a central controller 202, an active user database 122, a preactivation database 124, and a plurality of input/output ports 204. The central controller 202 may be implemented as various combinations of hardware, software, and firmware, including, for example, microprocessors, microcontrollers, or application specific integrated circuits. The central controller 202 supervises the reception of activation and preactivation data over the input/output ports 204 and their storage in the databases 122, 124. The databases 122, 124 may be implemented in one or more mass storage devices, such as magnetic disk drives, and the like.

The central controller 202 further supervises the transmission to the local switches 114 of the preactivation information and, in certain embodiments, the activation information. In particular, the central service center 112 receives password and preactivation information from or at a point of sale. The preactivation information includes, for example, a password or PIN, and an identification of the telephone, such as a serial number, as well as purchaser and billing information. Once received, the preactivation information is stored in the preactivation database 124 and propagated to the local switches.

Similarly, the activation information is received at the central switching center 112, either directly from the local switch 114 which originally receives it, or through propagation from another local switch. If directly received from the local switch, the central service center 112 forwards the update to the other local switches.

FIG. 3 is a block diagram of an exemplary local switch 114 according to an embodiment of the present invention. As shown, the local switch 114 includes a local controller 302, a local database 304, and a password collection unit 306. It is noted that, while shown as a single unit, in practice, the password collection unit 306 and local database 304 may be shared among several local switches. Thus, the figure is exemplary only.

The local controller 202 may be implemented as various combinations of hardware, software, and firmware, including, for example, microprocessors, microcontrollers, or application specific integrated circuits, as well as associated memory. The local database 304 implements the activation database 126 and the preactivation database 128. The password collection unit 306 may be implemented to include a known interactive voice response unit and is adapted to receive the user's password and check it with the information stored in the preactivation database 128, as will be described in greater detail below.

More particularly, the activation database 126 stores information regarding active cellular telephones while the preactivation database 128 stores preactivation information that has been sent from the central service center 112. As will be explained in greater detail below, the activation database 126 may also be updated from the central service center 112. In addition, the activation database 126 may be updated locally. For example, if a cellular telephone in the region serviced by the switch powers on, the switch 114 detects it, determines whether the telephone is present in the activation database 126 or the preactivation database 128. If in the preactivation database 128, the switch 114 waits for the password to be provided. If the password is verified, then the cellular telephone is activated, the cellular telephone is removed from the preactivation database 128 to the activation database 126, and the rest of the network switches 114 and the central service center 112 are informed of the update.

Turning now to FIG. 4, a flowchart illustrating operation of an embodiment of the present invention is shown. In a step 402, a password or personal identification number (PIN) is associated with a particular cellular telephone. For example, this may occur at a point of purchase or sale, or the password may have been pre-set with the telephone. In step 404, the preactivation information is provided to the central service center 112 and the local switches 114. Thus, for example, the preactivation information may include the password and telephone and user identification, as well as billing information. The preactivation information may be provided directly to the central service center 112, which then propagates the preactivation information to the local switches 114. When the information is received at the preactivation databases 124, 128, they are updated with the new information.

In step 406 a local switch 114 detects a power on of a cellular telephone and checks the activation and preactivation databases 126, 128. The cellular telephone is detected as not activated in step 408 if it is present in the preactivation database 128 or if present in neither database. In step 410, the local switch 114 receives the password or PIN at the password collection unit 306. In particular, the password collection unit 306 receives the password and accesses the preactivation database 128. The local switch 114 then verifies the password. Once the password is verified, in step 412, the activation database 126 is updated with the new information and the telephone is able to be used in the area serviced by the local switch 114. The updated activation database information is then propagated to the other local switches and the central service center 112, in step 414. In certain embodiments, the update information is provided or transmitted directly to the central service center 112, which then propagates the update to the other local switches 114. In other embodiments, the update information is propagated to the other local switches from the updating local switch itself.

Figure 5:
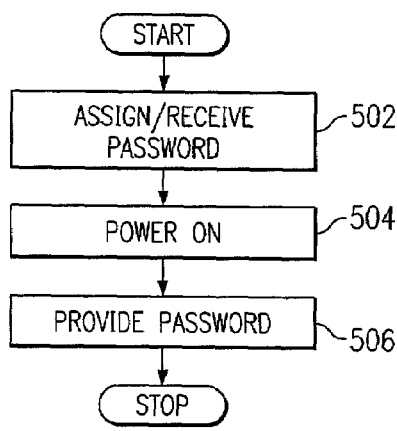
FIG. 5 is a flowchart illustrating operation of an embodiment of the present invention.

Turning now to FIG. 5, a flowchart illustrating operation of an embodiment of the present invention is shown. In step 502 a user receives or assigns a PIN or password at a time of purchase. In step 504, the user then powers on the cellular telephone. In step 506, the user enters the password. If the password and the preactivation information have been received at the local switch, and the password is verified, then the cellular telephone becomes operational in the region serviced by the switch.

Figure 6:
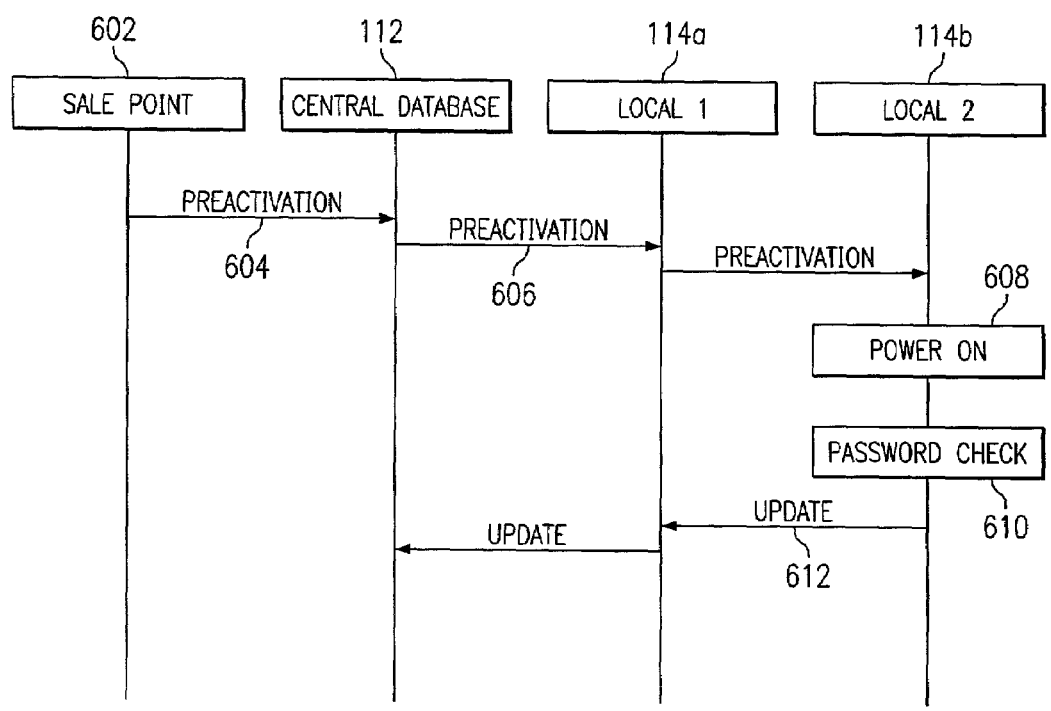
FIG. 6 is a diagram illustrating signaling according to an embodiment of the present invention.

FIG. 6 is a diagram illustrating signal flow according to an embodiment of the present invention. Shown are an exemplary sale point 602, the central database 112, a local switch 114a, and a local switch 114b. It is noted that in practice, more than one sale point and two local switches likely would be employed. Thus, FIG. 6 is exemplary only.

As shown, in 604, preactivation information is provided from a sale point 602 to the central database 112. The sale point 602 may be, for example, an Internet retailer, physical retailer, and the like. Moreover, while referring generally to initial sales, the teachings of the present invention apply equally to manufacturers distribution centers after, for example, warranty service. Preactivation information can include, for example, password, serial number, and billing information.

Once the preactivation information has been received at the central service center 112 and used to update its master database, the central service center 112 propagates the information to the local switches 114, at 606. The information can either be broadcast or relayed to the various local switches. The local switches 114 use the information to update their databases 128 of preactivation information.

Then, after the cellular telephone is delivered, the user powers it on, at 608. In the example illustrated, the cellular telephone is present in the region serviced by the local switch 114b. As such, the local switch 114b detects the power on. The local switch 114b then determines by accessing its local databases 126b, 128b (FIG. 1) that the cellular telephone is in preactivation mode. The local switch 114b thus does not allow service to the cellular telephone. Next, at 610, the local switch 114b receives the password from the cellular user, such as via the password collection unit 306, which may be an IVR system.

Once the password is verified, the local switch 114b updates its database and transmits the updates to the other switches or the central service center at 612.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications system, comprising:
a central control center maintaining a central database of users and a database of preactivation information; and
a plurality of local switches including one or more databases of preactivation information and adapted to detect a power-on of a cellular telephone, access said one or more databases of preactivation information, activate said cellular telephone at a local switch responsive to information contained in said preactivation databases, and forward activation information to said central database and others of said plurality of local switches.

2. A telecommunications system in accordance with claim 1, wherein said central control center is adapted to receive said preactivation information from a point of sale.

3. A telecommunications system in accordance with claim 2, wherein said central control center is adapted to propagate said preactivation information to said plurality of local switches.

4. A telecommunications system in accordance with claim 3, wherein said activation information comprises a valid password entry.

5. A telecommunications system, comprising:
a central control center maintaining a central database of users and a database of preactivation information; and
a plurality of local switches adapted to detect a power-on of a cellular telephone, activate said cellular telephone at a local switch and forward activation information to said central database;
wherein said central control center is adapted to receive said preactivation information from a point of sale;
wherein said central control center is adapted to propagate said preactivation information to said plurality of local switches;
wherein said activation information comprises a valid password entry;
wherein said activation information is propagated from an activating local switch to other switches.

6. A telecommunications system, comprising:
a central control center maintaining a central database of users and a database of preactivation information; and
a plurality of local switches adapted to detect a power-on of a cellular telephone, activate said cellular telephone at a local switch and forward activation information to said central database;
wherein said central control center is adapted to receive said preactivation information from a point of sale;
wherein said central control center is adapted to propagate said preactivation information to said plurality of local switches;
wherein said activation information comprises a valid password entry;

wherein said activation information is transmitted from an activating local switch to said central control center and propagated from said central control center to other switches.

7. A telecommunications method, comprising:
providing a central control center maintaining a central database of users and a database of preactivation information; and
providing a plurality of local switches including one or more databases of preactivation information and adapted to detect a power-on of a cellular telephone, access said one or more databases of preactivation information, activate said cellular telephone at a local switch responsive to information contained in said preactivation databases, and forward activation information to said central database and others of said plurality of local switches.

8. A method in accordance with claim 7, wherein said central control center is adapted to receive said preactivation information from a point of sale.

9. A method in accordance with claim 8, wherein said central control center is adapted to propagate said preactivation information to said plurality of local switches.

10. A method in accordance with claim 8, wherein said activation information comprises a valid password entry.

11. A method, comprising:
providing a central control center maintaining a central database of users and a database of preactivation information; and
providing a plurality of local switches adapted to detect a power-on of a cellular telephone, activate said cellular telephone at a local switch and forward activation information to said central database;
wherein said central control center is adapted to receive said preactivation information from a point of sale;
wherein said activation information comprises a valid password entry;
wherein said activation information is propagated from an activating local switch to other switches.

12. A method, comprising:
providing a central control center maintaining a central database of users and a database of preactivation information; and
providing a plurality of local switches adapted to detect a power-on of a cellular telephone, activate said cellular telephone at a local switch and forward activation information to said central database;
wherein said central control center is adapted to receive said preactivation information from a point of sale;
wherein said activation information comprises a valid password entry;
wherein said activation information is transmitted from an activating local switch to said central control center and propagated from said central control center to other switches.

13. A telecommunications switch in a telecommunications network, comprising:
a controller;
a database operably coupled to said controller, said database storing preactivation information; and
a password collection unit operably coupled to said controller adapted to receive a password of a detected cellular telephone;
wherein said preactivation information is propagated to said telecommunications switch from a point of sale of said cellular telephone and, responsive to a verification of said password, an activation of said cellular telephone by said controller at said telecommunications switch occurs, said database is updated with activation information and said activation information is forwarded to a central control center and other telecommunication switches in the network.

14. A telecommunications switch in accordance with claim 13, wherein said preactivation information is propagated to said telecommunications switch from said central control center.

15. A telecommunications switch in accordance with claim 14, wherein said activation information is propagated to said central control center responsive to said verification.

16. A telecommunications switch in accordance with claim 14, wherein said activation information is transmitted to said central control center responsive to said verification and said central control center propagates said activation information to other telecommunications switches in said network.

17. A telecommunications method, comprising:
associating a password with a cellular telephone;
providing said password and preactivation information from a distribution center or point of sale to a central control center;
propagating said password and preactivation information from said central control center to one or more local switches;
detecting a power on of said cellular telephone at one of said local switches;
verifying said password at said one of said local switches;
activating said cellular telephone at said local switch responsive to said verifying; and
providing activation information responsive to said activating from said local switch to said central control center and other local switches.

18. A telecommunications method in accordance with claim 17, wherein said associating a password comprises associating said password at a point of sale of said cellular telephone.

19. A telecommunications method in accordance with claim 17, wherein said providing activation information comprises transmitting said activation information from said local switch to said central control center.

20. A telecommunications method in accordance with claim 17, wherein said providing activation information comprises propagating said activation information from said local switch to said other switches.

21. A telecommunications system, comprising:
a central control center maintaining a central database of users and a database of preactivation information; and
a plurality of local switches adapted to detect a power-on of a cellular telephone, activate said cellular telephone at a local switch and forward activation information to said central database;
wherein said central control center is adapted to receive said preactivation information from a distribution center;
wherein said activation information comprises a valid password entry;
wherein said activation information is propagated from an activating local switch to other switches.

22. A telecommunications system, comprising:
a central control center maintaining a central database of users and a database of preactivation information; and
a plurality of local switches adapted to detect a power-on of a cellular telephone, activate said cellular telephone at a local switch and forward activation information to said central database;

wherein said central control center is adapted to receive said preactivation information from a distribution center;
wherein said central control center is adapted to propagate said preactivation information to said plurality of local switches;
wherein said activation information comprises a valid password entry;
wherein said activation information is transmitted from an activating local switch to said central control center and propagated from said central control center to other switches.

23. A method comprising:
providing a central control center maintaining a central database of users and a database of preactivation information; and
providing a plurality of local switches adapted to detect a power-on of a cellular telephone, activate said cellular telephone at a local switch and forward activation information to said central database;
wherein said central control center is adapted to receive said preactivation information from a distribution point;
wherein said activation information comprises a valid password entry;
wherein said activation information is propagated from an activating local switch to other switches.

24. A method, comprising:
providing a central control center maintaining a central database of users and a database of preactivation information; and
providing a plurality of local switches adapted to detect a power-on of a cellular telephone, activate said cellular telephone at a local switch and forward activation information to said central database;
wherein said central control center is adapted to receive said preactivation information from a distribution point;
wherein said activation information comprises a valid password entry;
wherein said activation information is transmitted from an activating local switch to said central control center and propagated from said central control center to other switches.

* * * * *